(12) United States Patent
Van Meter et al.

(10) Patent No.: US 6,467,119 B1
(45) Date of Patent: Oct. 22, 2002

(54) POINTING DEVICE CLEANER AND METHOD OF USE

(75) Inventors: Ronald Van Meter, Anna; David Clarke, Carbondale, both of IL (US)

(73) Assignee: Vanlark, Inc., Anna, IL (US)

( * ) Notice: Subject to any disclaimer, the term of this patent is extended or adjusted under 35 U.S.C. 154(b) by 0 days.

(21) Appl. No.: 09/648,014

(22) Filed: Aug. 25, 2000

(51) Int. Cl.$^7$ .............................................. A47L 25/00
(52) U.S. Cl. ...................................... 15/22.1; 15/97.1
(58) Field of Search ..................... 15/22.1, 28, 97.1, 15/101; 451/111, 259

(56) References Cited

U.S. PATENT DOCUMENTS

| | | | |
|---|---|---|---|
| 1,997,352 A | * 4/1935 | Vna Fleet | |
| 4,673,440 A | 6/1987 | Chapin, Jr. .................... | 134/8 |
| 4,760,618 A | 8/1988 | Chapin, Jr. .............. | 15/104.93 |
| 5,054,149 A | * 10/1991 | Si-Hoe et al. | |
| 5,418,999 A | 5/1995 | Smith .......................... | 15/106 |
| 5,495,632 A | * 3/1996 | Baker | |
| 5,652,990 A | * 8/1997 | Dreisen et al. | |
| 5,781,955 A | * 7/1998 | Hendricks | |
| 5,822,821 A | * 10/1998 | Sham | |
| 5,970,559 A | 10/1999 | Christy ......................... | 15/106 |
| 5,985,042 A | 11/1999 | Fiedler ........................... | 134/6 |
| 6,081,956 A | 7/2000 | Boys .......................... | 15/21.2 |

OTHER PUBLICATIONS

PCT International Search Report dated Jan. 3, 2002.

* cited by examiner

Primary Examiner—Terrence R. Till
(74) Attorney, Agent, or Firm—Husch & Eppenberger, LLC; Grant D. Kang

(57) ABSTRACT

The invention is a cleaning device (2) for a computer mouse (86) or other similar pointing device that can clean the entire surface of a position roller (90) quickly, easily, completely, and without damage to the workings of the mouse (86). The device has a body portion (6), a motor (10), and a cleaning head (14) that includes a drive wheel (30) for spinning the position rollers (90) that is in communication with the motor (10), and cleaning discs (34) for releasing accumulated dirt and dust into the mouse cavity (94). Rotation of the motor (10) transforms into rotation of the drive wheel (30), which in turn is transformed into rotation of the position rollers (90) inside a computer mouse (86). When a cleaning disc (34) is brought into contact with the rapidly spinning position roller (90), the accumulated dust and dirt thereon is released into the cavity (94) of the mouse (86) where it can be easily removed.

21 Claims, 6 Drawing Sheets

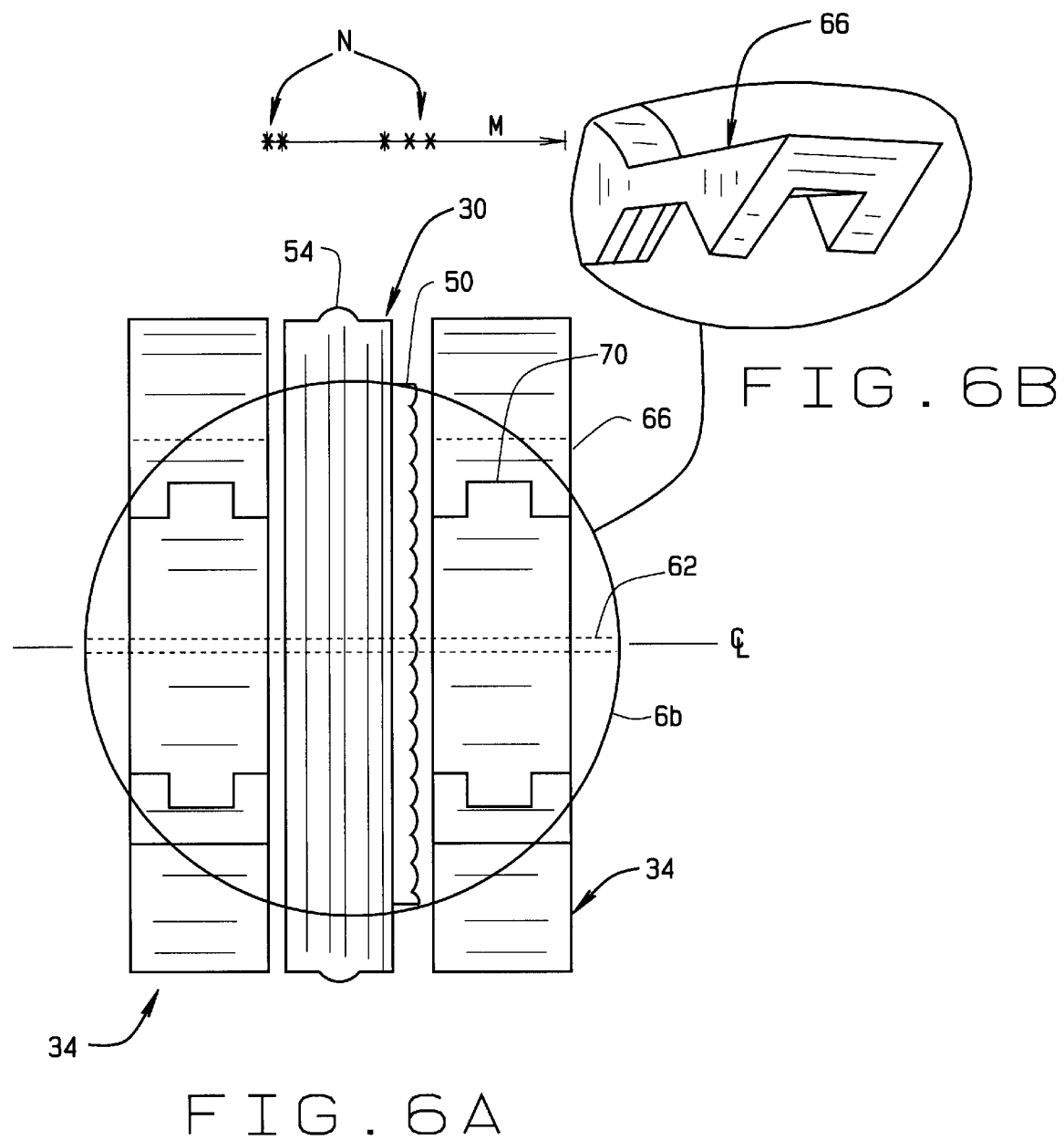

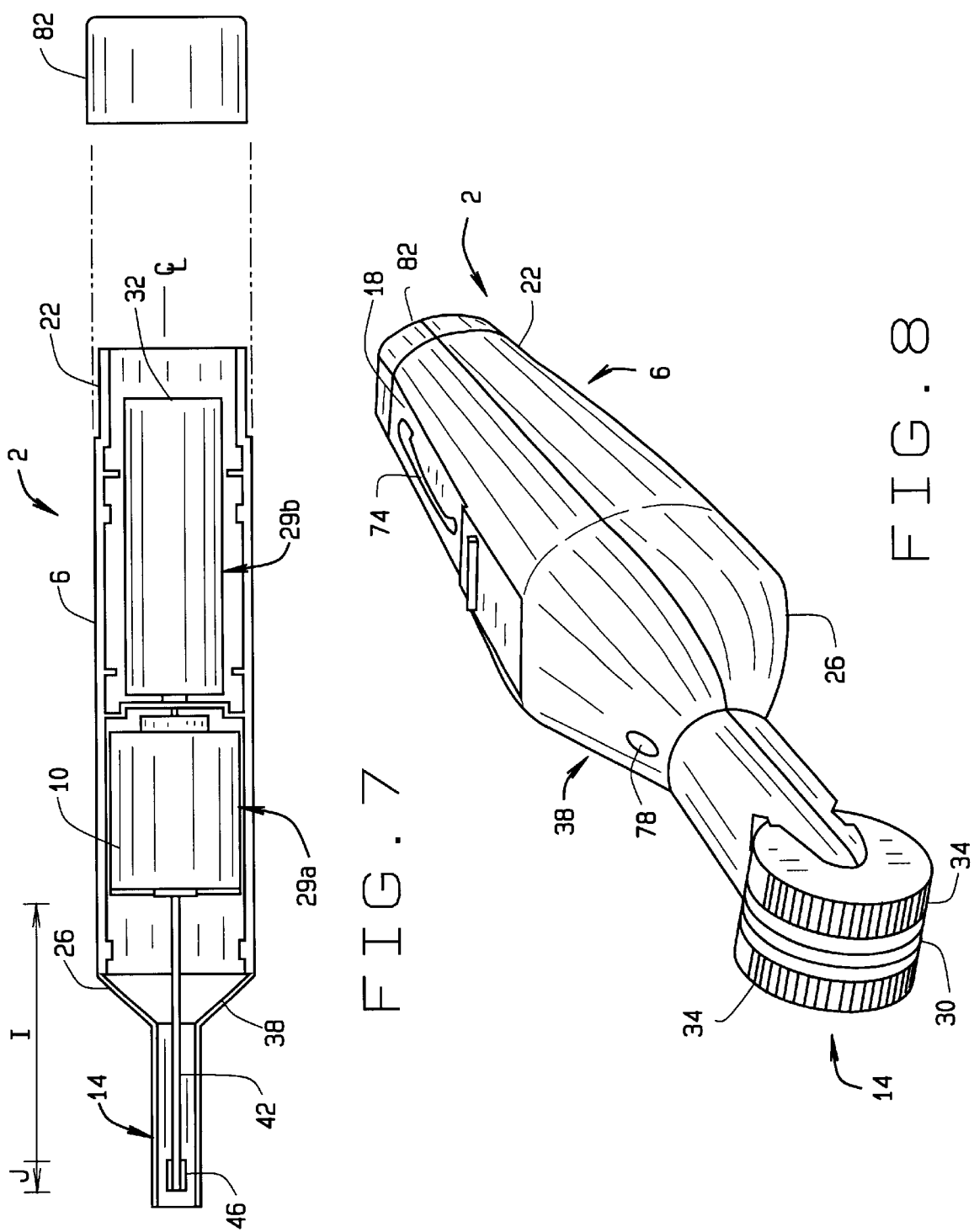

POINTING DEVICE CLEANER AND METHOD OF USE

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to cleaning devices for computers and computer accessories. More specifically, the present invention relates to a cleaning device for a computer mouse or similar pointing device.

BACKGROUND OF THE INVENTION

Computer users will be familiar with the device known as a "mouse," which is an input device used to move a "pointer" or "mouse cursor" around the monitor. A mouse is constructed of a housing, the bottom of which has a removable retaining ring with a circular port therein. A trackball, typically made of rubber coated metal, partially protrudes through the circular port. The remainder of the trackball occupies a cavity inside the mouse containing several position rollers. There are typically three position rollers, two of which serve to report horizontal and vertical movement to the computer and a third, shorter roller that provides a biasing force to hold the trackball in contact with the other two. When the mouse is used, the trackball rolls along a working surface, rotating the position rollers and sending horizontal and vertical motion information to the computer. Unfortunately, the trackball also picks up foreign matter, such as hair, lint, dirt, and other particles from the working surface. This foreign matter accumulates inside the mouse cavity and on the position rollers. The foreign matter impedes contact between the trackball and the position roller and impedes rotation of the position roller, thereby degrading the performance of the mouse over time. A simple solution to this problem is to periodically purchase a new mouse. This will become expensive, as a computer mouse typically costs between eight and fifty dollars depending on its features. Cleaning the position rollers inside the mouse is therefore a much more affordable, albeit more difficult, alternative.

The prior art has provided several different devices and methods for attempting to remove foreign matter from a computer mouse. For example, U.S. Pat. Nos. 4,673,440 and 4,760,618 to Chapin, Jr. teach a Velcro trackball and working surface designed to pick the dust and dirt off of the position rollers and deposit it on the working surface, and U.S. Pat. No. 5,985,042 to Fiedler teaches a scrubbing trackball that performs a similar function when rolled on an ordinary surface. However, these devices may re-deposit dirt and dust inside the cavity during use, may not uniformly clean the position roller, and must be cleaned frequently.

U.S. Pat. No. 5,970,559 to Christy teaches a cleaning device with a Velcro scrubbing surface that is designed to clean the entire surface of the position roller easily and that can clean all position rollers simultaneously. However, use of this device could lead to damage to the surface or alignment of the position rollers, especially the biasing position roller, and does not necessarily solve the problem of non-uniform cleaning.

U.S. Pat. No. 5,418,999 to Smith attempts to solve the non-uniform cleaning problem by providing a brush similar to a pipe cleaner. Though this device is less likely to damage the position rollers, the narrow cleaning surface makes it extremely difficult to clean all areas or even distinguish between cleaned and uncleaned surfaces. Furthermore, the narrow cleaning surface may only push the accumulated dirt and dust along the length of the position roller rather than releasing or collecting it therefrom.

SUMMARY OF THE INVENTION

It is in view of the above problems that the present invention was developed. The invention is a cleaning device for a computer mouse or other pointing device that can clean the entire surface of a position roller quickly, easily, completely, and without damage to the workings of the mouse. The device has a body portion, a motor, and a cleaning head that includes a drive wheel in communication with the motor for spinning the position rollers and cleaning discs for releasing accumulated dirt and dust into the cavity.

In the preferred embodiment of the invention, a shaft extends from the motor and into the cleaning head, terminating in a pinion gear. The pinion gear meshes with a drive gear on the drive wheel so that rotation of the motor is transformed into rotation of the drive wheel, which is in turn transformed into rotation of the position roller inside the mouse. The friction between the drive wheel and the position roller can be increased by surrounding the diameter of the drive wheel with an elastomeric material. Two cleaning discs with rowelled edges are provided, one to either side of the drive wheel, to release the accumulated dirt and dust from the position roller and into the cavity. The cleaning head which is of a narrower diameter than the body portion of the device and which is offset from the center thereof, cleans the entire length of the position rollers.

The present invention provides a cleaning device that can rapidly, simply, and uniformly clean the position rollers inside a computer mouse without damaging the workings of the computer mouse.

The present invention also provides a cleaning device that will release rather than collect the accumulated dirt and dust from the position rollers inside a computer mouse such that it cannot become re-deposited during the cleaning process.

The present invention further provides a cleaning device that will ensure the entire surface of a position roller inside a computer mouse is cleaned.

Further advantages of the present invention will be apparent from the description below with reference to the accompanying drawings in which like numbers indicate like elements.

BRIEF DESCRIPTION OF THE DRAWINGS

FIG. 6A is a view of the cleaning head taken along line 6—6 shown in FIG. 5.

FIG. 6b is a perspective detail taken from circle 6b in FIG. 6.

FIG. 7 is an interior side view of the cleaning device with the housing portion partially removed.

FIG. 8 is a perspective view of the cleaning device.

DETAILED DESCRIPTION OF THE INVENTION

Figure 1:
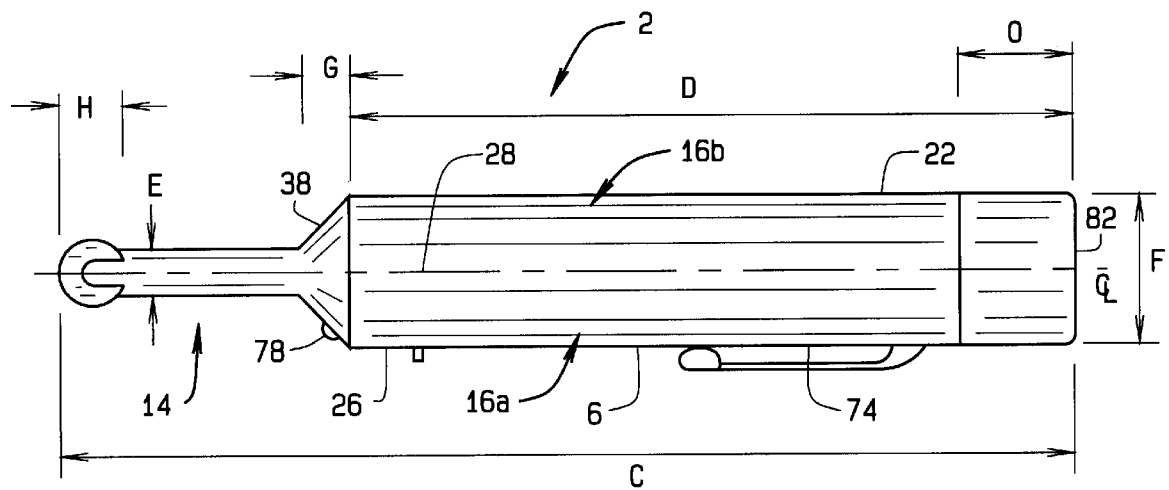
FIG. 1 is a side view of the cleaning device where the drive wheel is perpendicular to the line of sight.

As shown in FIGS. 1–9, a mouse cleaning device 2 generally includes a substantially cylindrical, elongated body portion 6, a motor 10, and a cleaning head 14. In the preferred embodiment of the invention shown in FIG. 1, the overall length C of device 2 is 144 mm and the length D of body portion 6 is 10.3 cm.

Body portion 6, which is made up of an upper half 16a and a lower half 16b, has flat surface facet 18, proximal end 22, and distal end 26 where cleaning head 14 is located. A clamshell joint 28 joins the two halves 16a and 16b of body portion 6. As best illustrated by FIG. 7, the interior of body portion 6 is divided into a forward compartment 29a and a rearward compartment 29b. Motor 10 is housed in forward compartment 29a, while rearward compartment 29b contains a power source 32, preferably a standard 1.5 volt AA battery.

Figure 2:
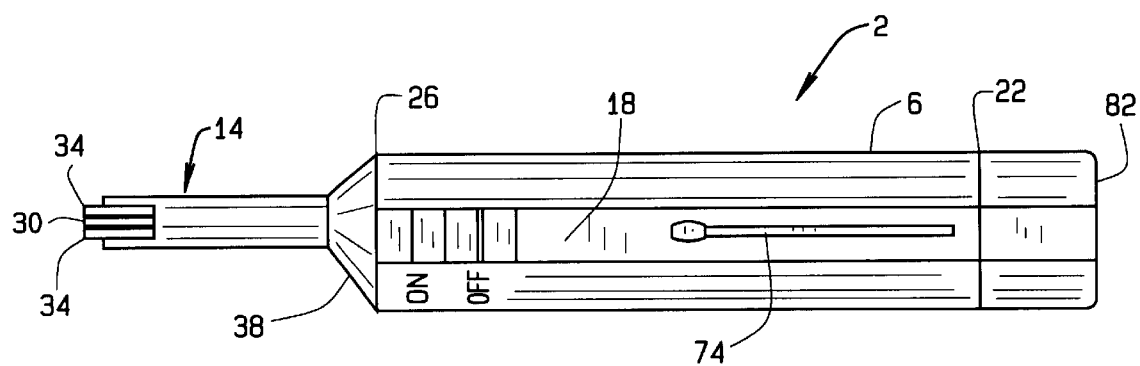
FIG. 2 is a side view of the cleaning device where the drive wheel is parallel to the line of sight.
Figure 2B:
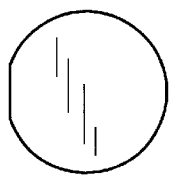
FIG. 2b is a proximal end view of FIG. 2.

Cleaning head 14 includes a drive wheel 30 and a plurality of cleaning discs 34. In the preferred embodiment, the diameter E of cleaning head 14 is 8 mm, which is smaller than the diameter F of body portion 6 at 23 mm. In addition, cleaning head 14 is preferably offset 2 mm from and parallel to the center longitudinal axis of body portion 6 as shown in FIG. 2. This can be accomplished by incorporating a neck 38 between distal end 26 and cleaning head 14. In the preferred embodiment, neck 38 has a slope of 45 degrees and a length G of 7 mm. The plurality of cleaning discs 34 ensure that cleaning head 14 can reach the entire length of the position rollers 90 located inside a computer mouse 86, a portion of which would otherwise be inaccessible because of the body of mouse 86.

Figure 2C:
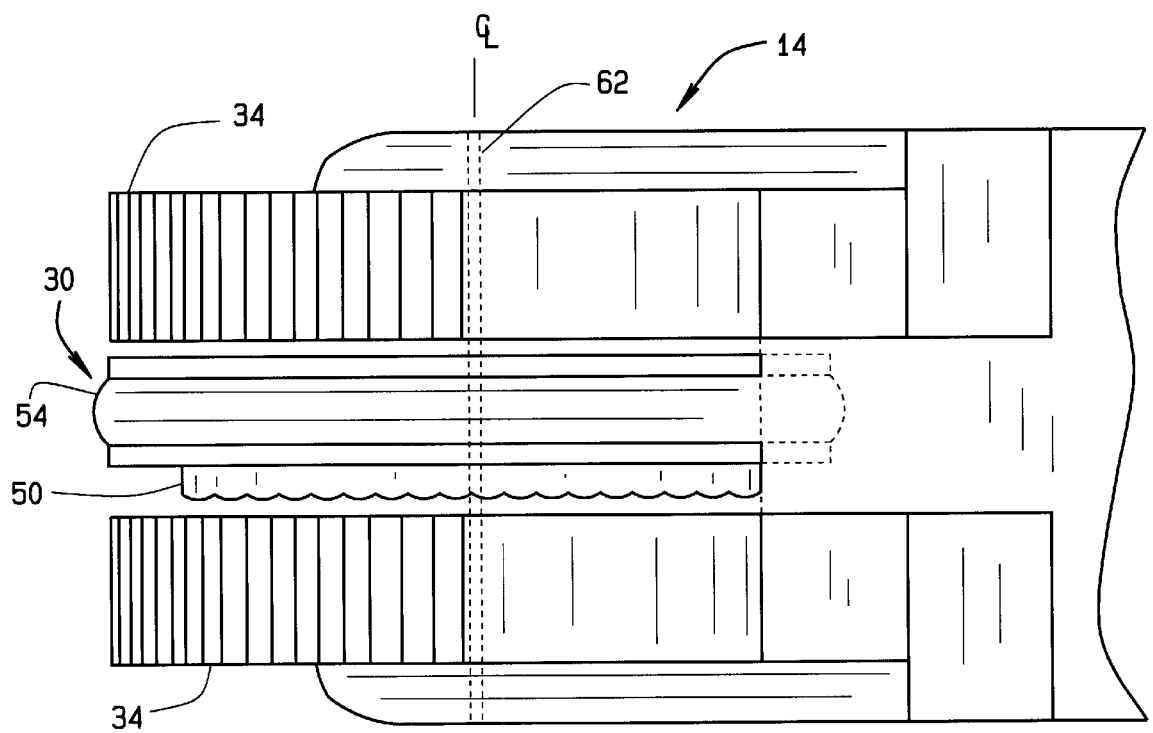
FIG. 2c is an enlarged detail view of the cleaning head shown in FIG. 2.
Figure 3:
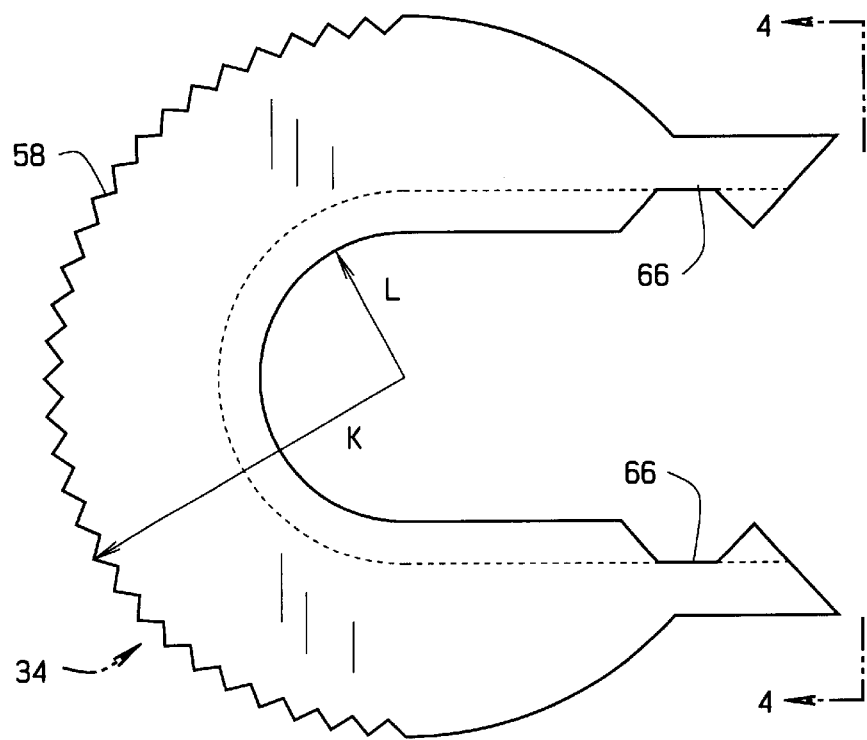
FIG. 3 is a detailed view of the cleaning disc.
Figure 4:
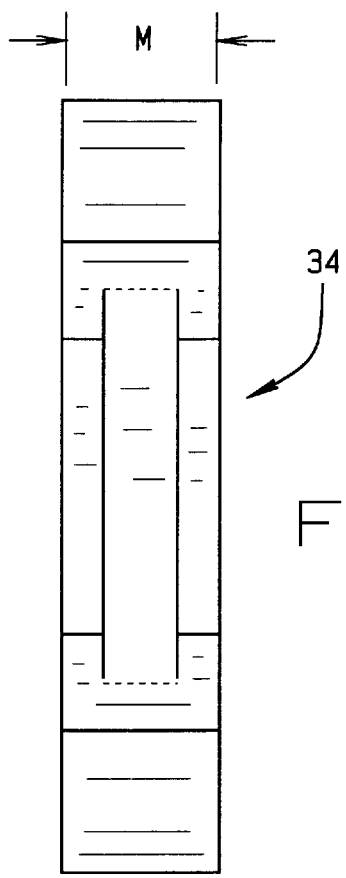
FIG. 4 is an end view of the cleaning disc taken along line 4—4 shown in FIG. 3.

Drive wheel 30, preferably with a diameter H of 1 cm, is in communication with motor 10. In the preferred embodiment shown in FIG. 7, motor 10 has a shaft 42 extending therefrom and into cleaning head 14, terminating in pinion gear 46. The preferred length I of shaft 42 is 42 mm, and pinion gear 46 preferably has a height J of 5 mm. Pinion gear 46 meshes with a drive gear 50 on drive wheel 30 and shown in FIGS. 2c and 6A. When activated, motor 10 will turn shaft 42 and pinion gear 46. Pinion gear 46 will, in turn, rotate drive gear 50 and, therefore, drive wheel 30. It should be understood that other methods of communicating the rotation of motor 10 to drive wheel 30 are contemplated as within the scope of the present invention. The circumference of drive wheel 30 may also be surrounded with a bead 54, preferably made from an elastomeric material and on the order of millimeters thickness, in order to increase the traction and reduce slippage between drive wheel 30 and the position rollers 90 inside the mouse 86. The particular configuration of drive wheel 30 and motor 10 is selected so that drive wheel 30 will impart a high angular velocity to the position rollers 90 when the two surfaces come into contact, as higher angular velocities will reduce cleaning time and increase cleaning efficiency. Preferably, motor 10 is commercially obtained from Mabuchi Motor Co., Ltd. in Japan as model no. FA-130RA, but modified slightly by using a narrower and longer output shaft.

Figure 5:
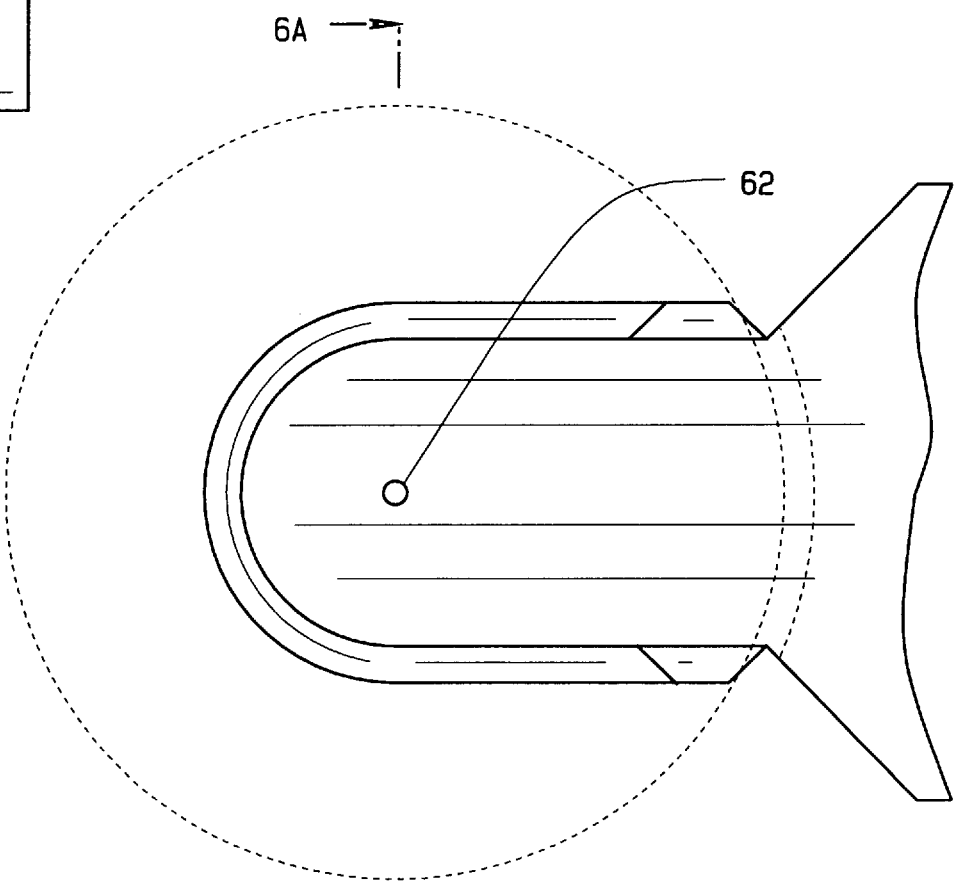
FIG. 5 is an enlarged detail view of the cleaning head shown in FIG. 1.

Cleaning discs 34 are disposed in planes substantially parallel to drive wheel 30 but do not touch drive wheel 30 or rotate about an axis. This orientation ensures that spinning position rollers 90 contact cleaning discs 34 at the proper angle to propel accumulated foreign material off position roller 90. In the preferred embodiment shown in FIGS. 3 and 4, cleaning discs 34 are made out of a hard nylon and have rowelled edges 58 (preferably with rowelling similar to but coarser than the edge of a dime) to facilitate the removal of dirt and other foreign material from position rollers 90 inside mouse 86. Cleaning disc 34 preferably has an outside radius K of 5 mm, an inside radius L of 2 mm, and a thickness M of 2 mm. However, it is contemplated that cleaning discs 34 could be made or shaped in other ways that would facilitate the removal of dirt and other foreign material from rapidly spinning position rollers 90 without damaging the surfaces of position rollers 90. For example, cleaning discs 34 could be made out of a material similar to a pencil eraser. Cleaning discs 34 may be removable and disposable so that old, worn parts can be replaced with new parts when the cleaning performance of device 2 begins to degrade. The preferred embodiment of device 2, illustrated in FIGS. 3–6b, includes a pair of cleaning discs 34 disposed on opposite sides of and in planes substantially parallel to drive wheel 30 as shown in FIG. 5. Preferably, the width N of the gap between drive wheel 30 and cleaning disc 34 is 0.5 mm. In this configuration, a slight tilt of device 2 in either direction will bring a cleaning disc 34 into contact with the position roller being cleaned. Cleaning discs 34 are preferably designed to attach to cleaning head 14 and fit around an axle 62 that forms the axis of rotation for drive wheel 30. It is intended that cleaning discs 34 and axle 62 never come into contact so that the rotation of axle 62 will not cause wear on cleaning discs 34. Securing keys 66, best shown in FIG. 6b, mate with tangs 70 on cleaning head 14 to secure cleaning discs 34 thereto.

As best shown by FIG. 1, cleaning device 2 may optionally include a clip 74 on body portion 6, preferably near proximal end 22, and headlight 78 at distal end 26. Clip 74 can be used to wear device 2 in a shirt pocket much like one would wear a pen, while headlight 78 serves to illuminate the inside of computer mouse 86 while it is being cleaned, thus making it easier to tell when all surfaces of position rollers 90 have been cleaned. A removable cap 82 with length O of 17 mm can also be provided at proximal end 22 for accessing and replacing power source 32.

Figure 9:
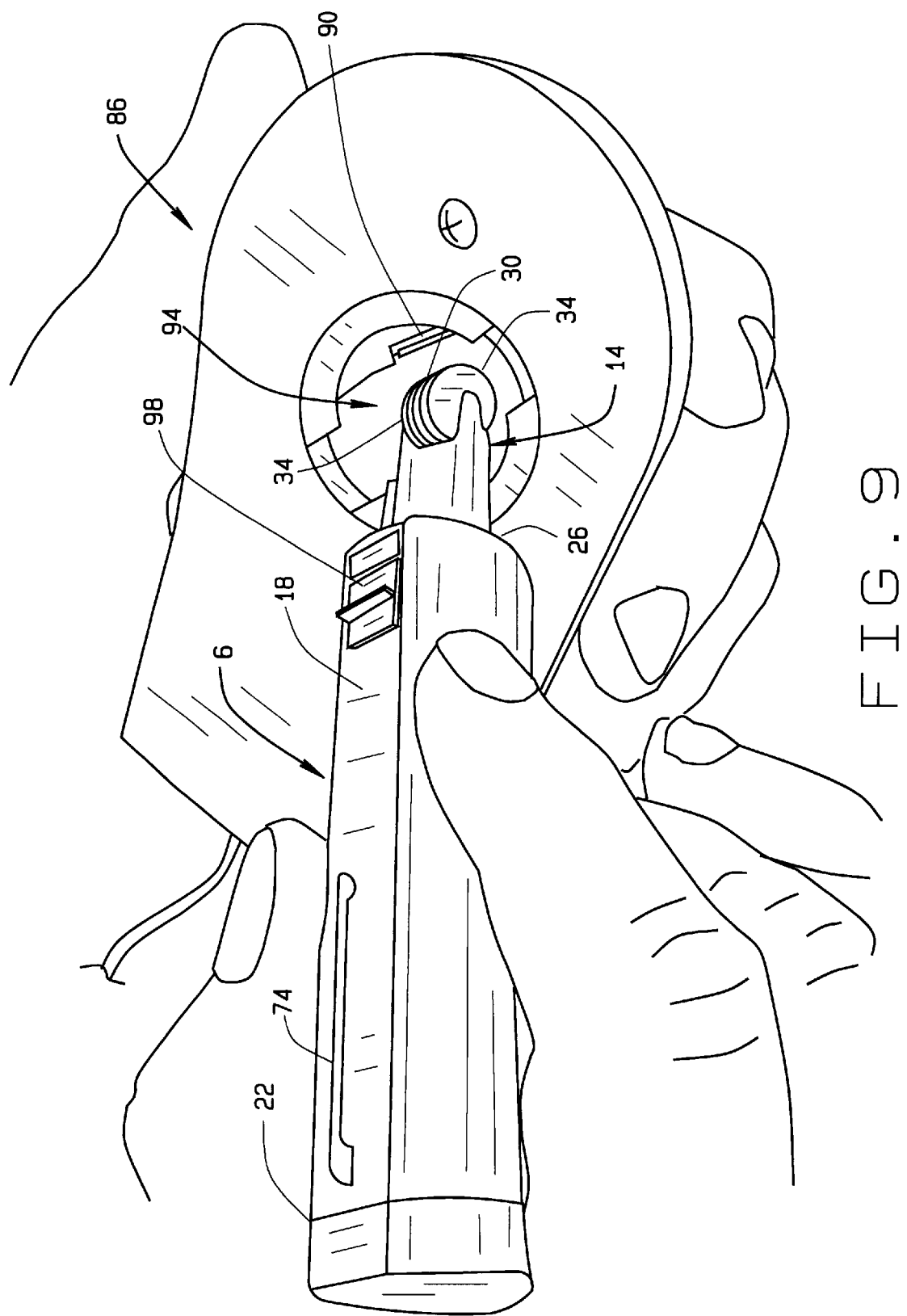
FIG. 9 is a view of the cleaning device being extended into the cavity of a mouse.

The use of device 2 is illustrated by FIG. 9, which shows a computer mouse 86 with the retaining clip and trackball removed. In this particular drawing, only one position roller 90 is visible inside cavity 94, but it should be understood that a typical computer mouse 86 will have multiple position rollers 90 oriented in different directions. Cleaning head 14 of device 2 is inserted into cavity 94, and drive wheel 30 is brought into contact with position roller 90. Motor 10 is then activated, for example by toggling switch 98 from an "off" position into an "on" position. The rotation of motor 10 is communicated to drive wheel 30, which in turn spins position roller 90 about its axis. The position roller 90 will only rotate about its axis (as it does during normal use) and will not pitch or yaw, thereby considerably reducing the 5 possibility of damaging the workings of the mouse 86. Device 2 is then tilted slightly in either direction to bring cleaning disc 34 into contact with position roller 90. The angular velocity of position roller 90 and construction of cleaning disc 34 are sufficient such that brief, light contact with rowelled edge 58 of cleaning disc 34 separates accumulated dirt and other foreign material from the circumference of position roller 90 and releases it into cavity 94. However, cleaning disc 34 is not so hard or abrasive as to damage position roller 90, and the angular velocity of position roller 90 is high enough that little force need be applied by the user in order to clean position roller 90, reducing the possibility of damage to the mouse even further. Device 2 can then be moved lengthwise along position roller 90 at a comfortable speed. Since position roller 90 will have an extremely high angular velocity, the user can be assured that position roller 90 will rotate more than one full turn with cleaning disc 34 in contact with any given point on position roller 90, thereby ensuring that the entire surface area will be cleaned quickly, effectively, and uniformly. The released dirt and other foreign material is then removed from cavity 94, for example by inverting mouse 86 and shaking it out or via suction such as from a vacuum cleaner.

As various modifications could be made in the constructions and methods herein described and illustrated without departing from the scope of the invention, it is intended that all matter contained in the foregoing description or shown in the accompanying drawings shall be interpreted as illustrative rather than limiting. It will also be obvious to one skilled in the art that the present invention can be used for all pointing devices similarly configured to a computer mouse. Thus, the breadth and scope of the present invention should not be limited by any of the above-described exemplary embodiments, but should be defined only in accordance with the following claims appended hereto and their equivalents.

What is claimed is:

1. A cleaning device for use with a computer pointing device having at least one roller, said cleaning device comprising:
    a substantially cylindrical, elongated body portion having a distal end and a proximal end;
    a motor; and
    a cleaning head located at said distal end of said body portion, said cleaning head having a drive wheel in communication with said motor and having a cleaning element spaced apart from said drive wheel.

2. The cleaning device according to claim 1, wherein said body portion comprises an upper half and a lower half.

3. The cleaning device according to claim 2, wherein said upper half and said lower half are connected by a clamshell joint.

4. The cleaning device according to claim 1, wherein said body portion further comprises a substantially flat surface.

5. The cleaning device according to claim 1, further comprising a pen-type clip attached to said body portion.

6. The cleaning device according to claim 1, further comprising a headlight disposed at said distal end of said body portion.

7. The cleaning device according to claim 1, further comprising a removable cap.

8. The cleaning device according to claim 1, wherein a circumference of said drive wheel is surrounded by a bead comprised of a traction-increasing material.

9. The cleaning device according to claim 8, wherein said bead is comprised of an elastomeric material.

10. The cleaning device according to claim 1, wherein said motor further comprises a shaft extending therefrom towards said cleaning head.

11. The cleaning device according to claim 10, further comprising a pinion gear disposed in said cleaning head and attached to said shaft at an end opposite said motor.

12. The cleaning device according to claim 11, wherein said drive wheel further comprises a drive gear attached thereto, said drive gear meshed with said pinion gear.

13. The cleaning device according to claim 1, wherein a diameter of said cleaning head is narrower than a diameter of said body portion.

14. The cleaning head according to claim 13, further comprising a neck portion disposed between said distal end and said cleaning head.

15. The cleaning device according to claim 13, wherein said cleaning head is offset from and parallel to a center longitudinal axis of said body portion.

16. The cleaning device according to claim 1, further comprising a second stationary cleaning element to form a pair of cleaning discs disposed on opposite sides of and in planes substantially parallel to said drive wheel.

17. The cleaning device according to claim 16, wherein said cleaning discs are removable.

18. The cleaning device according to claim 17, wherein said cleaning discs are disposable.

19. The cleaning device according to claim 16, wherein said cleaning discs attach to said cleaning head around an axle that forms the axis of rotation of said drive wheel.

20. The cleaning device according to claim 19, wherein a plurality of keys on said cleaning discs mate with a plurality of tangs on said cleaning head.

21. A cleaning device for use with a computer pointing device having at least one roller, said cleaning device comprising:
    a substantially cylindrical, elongated body portion having a distal end and a proximal end;
    motorized drive means for imparting an angular velocity to a roller; and
    cleaning means for releasing accumulated dirt from the roller.

* * * * *